Jan. 1, 1952  J. L. BONANNO ET AL  2,581,166
ELECTRIC MOTOR REVERSING MEANS
Filed Oct. 15, 1949  3 Sheets-Sheet 1
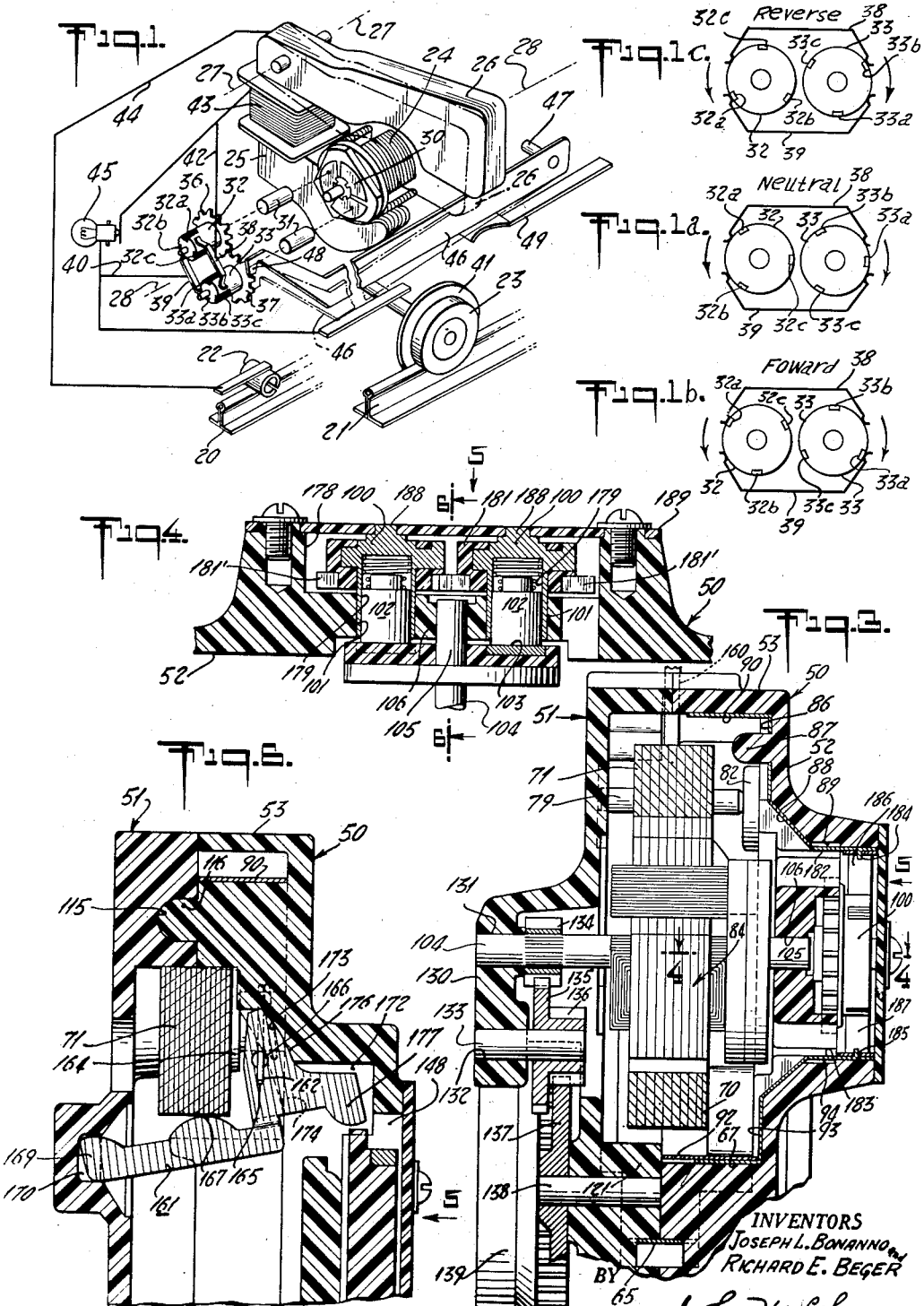
INVENTORS
JOSEPH L. BONANNO
RICHARD E. BEGER
BY
ATTORNEY

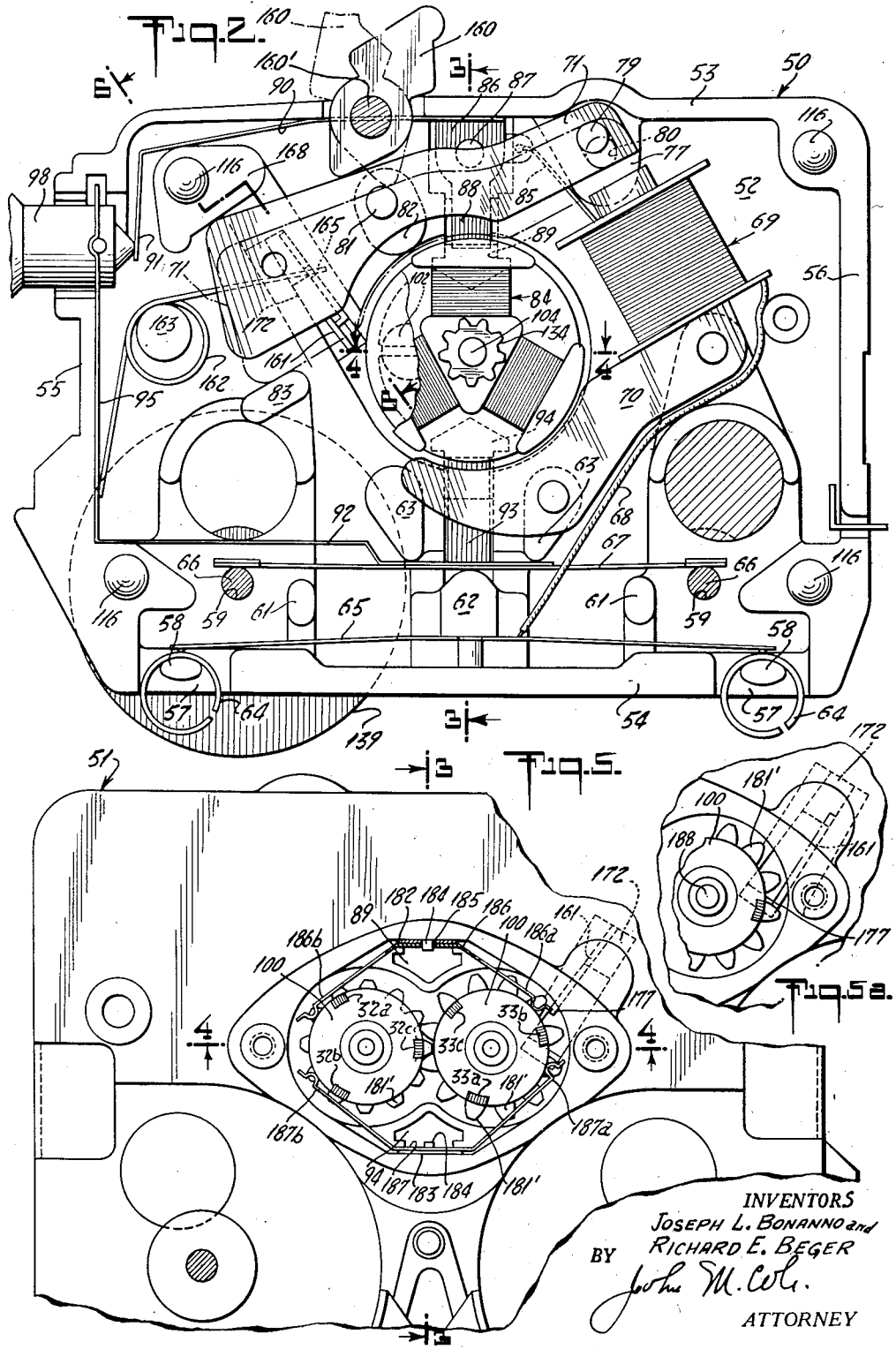

Jan. 1, 1952     J. L. BONANNO ET AL     2,581,166
ELECTRIC MOTOR REVERSING MEANS

Filed Oct. 15, 1949     3 Sheets-Sheet 3

INVENTORS
JOSEPH L. BONANNO and
RICHARD E. BEGER
BY
ATTORNEY

Patented Jan. 1, 1952

2,581,166

UNITED STATES PATENT OFFICE 2,581,166

ELECTRIC MOTOR REVERSING MEANS

Joseph L. Bonanno, Madison, and Richard E. Beger, Jersey City, N. J., assignors to The Lionel Corporation, New York, N. Y., a corporation of New York Application October 15, 1949, Serial No. 121,495

24 Claims. (Cl. 318—293)

The present invention relates to electric motor reversing means and is more particularly directed toward such reversing means for commutator type motors wherein the control of polarity of the armature windings is effected by manipulating the brush boxes to change their connection to an extraneous current source.

The circuit control for the motor reversal may be employed with series or shunt type motors or with motors having permanent fields, and to motors having disc or cylindrical type commutators, and, while the preferred constructions employ a part of the field structure of a wound field type motor to effectuate motor reversal on succeeding energizations thereof, it is possible to employ an electromagnetic or manual operator for the same purpose; also the contact arrangement and controls may be such as to effect reversal on each energization or to open the motor circuit between reversals.

The present invention contemplates that the motor will be provided with a pair of brush boxes (or more if required by the number of poles of the motor), that each brush box will be mounted for rotation about an axis normal to the commutator surface which the brush therein contacts, and that each brush box will be provided with circumferentially arranged alternately disposed conducting and non-conducting segments.

According to the present invention, means is provided for concurrently turning the brush boxes while they are in timed relation with one another so that the segments are positioned relative to one another in a predetermined manner, and fixed bridging conductors are arranged to have contacts which bear on the segmented surfaces of the brush boxes, these conductors and contacts being so located that the interrelation of the conductors and the conducting segments may be changed as the brush boxes are rotated step by step.

The rotation of the brush boxes is, according to the present invention, accomplished by an indexing mechanism. Such mechanism is preferably remotely controlled concurrently with the energization of the motor and employs electromagnetic action, either obtained through a movable part of the motor field or by means of a separate electromagnet. Instead of having a remote control, the control may be manual and of a type which will lock the electromagnetic control out of action to maintain constant direction of motor operation.

Where it is desired to provide the motor with a start-stop-reverse-cycle and shifting of the brush boxes is effected by the motor field, the armature circuit is open when the motor is stopped. In such cases the present invention contemplates the employment of a circuit in shunt with the armature and reversing mechanism of sufficient current carrying capacity to pass enough current to magnetize the field at least momentarily sufficiently to operate the reversing switch mechanism. Where such start-stop-reverse cycle is desired manually or by magnetic operation extraneous of the field, such shunt circuit is not required. Also such shunt circuit may or may not be present where a simple start and reverse cycle is desired.

The accompanying drawings show, for purposes of illustrating the present invention, several embodiments in which the invention may take form, it being understood that the drawings are illustrative of the invention rather than limiting the same.

In the accompanying drawings:

Figure 1 is a diagrammatic perspective view of a propulsion unit of a toy locomotive employing a motor with disk type commutator and field actuated indexing mechanism for obtaining a start-stop-reverse cycle of operations, and includes a superposed circuit diagram showing in full lines the motor field in the deenergized position and in dot and dash lines the motor field in the energized position;

Figures 1a, 1b and 1c are diagrammatic views illustrating the different positions of the segments on the brush boxes;

Figure 2 is a side elevational view of a toy electric locomotive embodying the motor and reversing switch diagrammatically shown in Fig. 1 and taken from the opposite end of the motor shaft, with similar dot and dash line position of the field;

Figure 3 is a vertical sectional view on the line 3—3 of Figures 2, 4 and 5, taken in the direction of the arrows showing the completely assembled toy electric locomotive motor;

Figure 4 is a horizontal sectional view taken on the line 4—4 of Figures 2, 3 and 5, the reversing switch being in the neutral position of Figure 1a;

Figure 5 is an elevational view of the motor taken in the direction of the arrow 5 of Figures 3, 4 and 6, parts being removed to show the brush boxes and indexing mechanism;

Figure 5a is a fragmentary view showing parts of Figure 5 in a different position;

Figure 6 is a sectional view taken on the broken line 6—6 of Figure 2;

Figure 7:
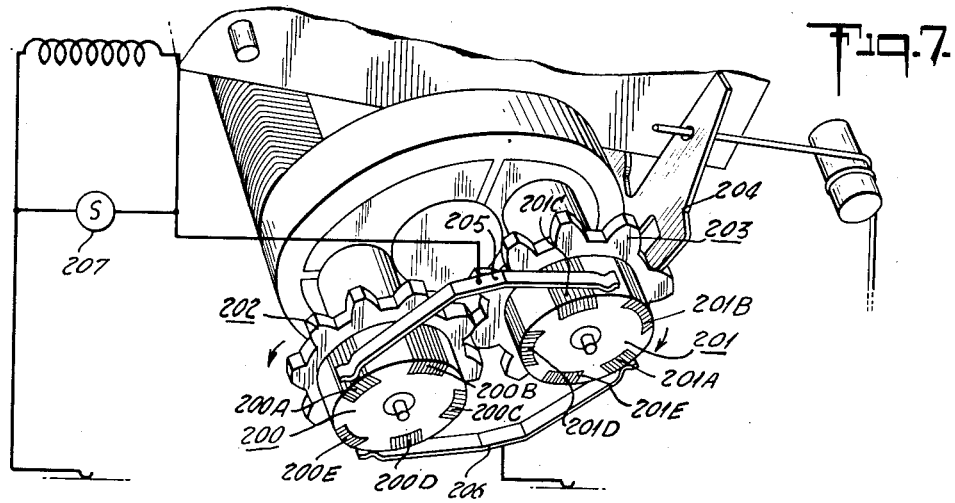
Figure 7 is a perspective view illustrating a contact arrangement for a motor with a start and reverse cycle.

In the form of construction illustrated in Figures 1 and 1a, 1b, 1c, inclusive, a form of the invention is shown adapted for employment in a series motor of the disk commutator type, for example, as the propulsion motor of a toy electric locomotive.

Referring to the wiring diagram of Figure 1, it will be seen that the current to the propulsion motor is supplied through power and return rails 20 and 21 by means of current collectors 22 and 23. The motor armature is indicated at 24. The motor field is in two parts 25 and 26, the part 26 being pivoted to move about an axis 27, 27 parallel with the axis 28, 28 of the armature shaft. The disk type commutator is indicated at 30 and the brushes at 31, 31. These brushes are received in brush boxes 32 and 33, each brush box carrying a series of contacts 32a, b, c, 33a, b, c, peripherally arranged and electrically connected to one another and the box proper. These brush boxes carry insulation segments between the conducting segments and the insulating gears, indicated at 36 and 37, in mesh as shown. For a bi-polar motor each brush box carries three equally spaced contacts and each of the gears has twelve teeth.

The brush boxes 32 and 33 are spanned by bridging conductors 38 and 39 of a proper length to bear on the conducting and insulating segmented surfaces of the brush box and engage or disengage the conducting segments as desired. The bridging conductor 39 is connected by wiring indicated at 40 with the driving wheel 41 of the locomotive so as to ground this side of the circuit. The bridging conductor 38 is connected by a wire 42 with the field coil 43 of the motor and the other end of this field coil is connected by wire 44 with the current collector 22. In shunt with the field coil is a headlight lamp indicated at 45. The movable field element 26 bears on a pawl arm 46 pivoted at 47 and having an end 48 engageable with the tooth of the gear 37. The pawl 46 and field part 26 are normally shifted away from the armature by a spring indicated at 49.

When the parts are in the relative position shown in Figures 1 and 1a, the circuit is opened through the armature and the motor is stopped. If the tracks are energized by supplying current for proper potential for operating the motor to operate the train, current will flow through the motor field and the shunt circuit of the lamp 45 to the grounded return. As the armature circuit is open, no current flows through the armature circuit at the instant the supply of potential is impressed. The headlamp 45, however, is preferably one which has a rather low cold resistance, passing, for example a $\frac{6}{10}$ of an ampere. This much current momentarily flowing through the cold filament of the lamp energizes the field, causing the movable field part 26 to be attracted toward the armature or to the dot and dash line position of Figure 1. This movement of the field will operate the pawl and through the pawl shift the brush boxes from the neutral position of Figures 1 and 1a to the "forward" position of Figure 1b. This will shift the contacts 32a and 33a so as to bring them into engagement with the bridging members 38 and 39, respectively, thereby energizing the brush boxes and the armature and causing the motor to operate.

The motor continues to operate as long as current is supplied and the lamp 45 continues to operate as an ordinary headlight. Its hot resistance is many times its cold resistance. Opening the circuit to the tracks will deenergize the motor so that the spring 49 can now shift the movable field element 26 and pawl 46 up to the full line position. The next time the motor is energized by supplying power to the tracks, the indexing mechanism will advance the gearing one more tooth. This will shift the contacts 32a and 33a on the brush boxes away from the bridging conductors 38 and 39 so that when the armature circuit is opened the motor does not start. The armature circuit stays open but the lamp 45 continues to operate as well as any other accessories connected to the track circuit, until the power has been cut off.

On restoration of power, the field will again be attracted and the contacts 32a and 33a will be moved to the position shown in Figure 1c where 33a contacts 38 and 32a contacts 39, so that current now flows through the armature in the reverse direction. Thus, it will be seen that by repeatedly opening and closing the circuit to the track, the propulsion motor can be operated forward or backward, or deenergized while current continues to flow to the headlamp and other accessories.

The present invention is particularly directed toward the features, according to which the above stated start-stop-reverse cycle of operations is carried out and wherein the switching is accomplished by brush boxes provided with conducting and insulating segments and moved from one position to the next to change the circuit relations. Heretofore, in the toy railroad art, constructions for accomplishing start-stop-reverse control, or mere reverse control, have required the provision of separate circuit controllers extraneous of the motor, as shown, for example, in Bonanno Patent 2,155,343 of April 18, 1939, or Sparks Patent 1,622,815 of March 29, 1927.

Figures 2 to 6, inclusive, show a toy railroad propulsion motor embodying the arrangement set forth diagrammatically in Figures 1, 1a, 1b, 1c. The toy locomotive and motor shown in Figures 2 through 6 is more fully shown and described in our co-pending application Serial No. 121,494 filed concurrently herewith.

The propulsion unit has a housing composed of two plastic moldings designated generally as 50 for the right housing and 51 for the left housing. These housings are of generally rectangular shape.

The right housing part 50 has a vertical side wall 52, top wall 53, bottom wall 54, front wall 55 and rear wall 56, all terminating in a common plane. The bottom wall 54 is recessed as indicated at 57, 57 and centrally of these recesses carries lugs 58, 58. Slightly higher up the side wall 52 are openings 59, 59 for the axles 60. Adjacent the holes 59, 59 are forwardly extending lugs 61, 61 and intermediate these lugs is another forwardly extending lug 62. Above and to the side of the lug 62 are two forwardly extending lugs 63, 63.

The recesses 57, 57 and lugs 58, 58 are adapted to receive current collecting rollers 64, 64. Conducting strap 65 bears on these rollers and is held in place by the lug 62. The strip 65 is resilient and yields when the rollers 64 are on the third rail. The holes 59 receive the wheel axles 66, 66. A resilient conducting strip 67 bears on the axles 66, 66 and extends between the upper face of lug 62 and the lower faces of lugs 63, 63, so that current can be carried from the power and wheel bearing rails into the locomotive housing. When the axles are out, the contact strip 67 bears on top of lugs 61. The conducting strip 65 is connected by a wire 68 with the coil 69 carried on one part 70 of a motor field having a separate movable part 71. The motor field part 70 is held in place in the housing part 50 as set forth in the application above referred to.

The other laminated part of the field, namely, the part 71, has pin 79 which enters an elongated recess 80 in the elevated portion 77 of the housing part 50 and another pin 81 which bears against an elevated area 82 in the housing part 50. The motor field part 71 is in the position indicated in dot and dash lines in Figure 2 when the motor is in operation and is held against a stop 83 projecting forwardly from the side wall 52 of the housing part 50. The field part 71 may be locked in this position or it may be brought to this position when current is applied to energize the motor because the magnetic field set up by the coil 69 through the field structure 70, 71 and the armature, indicated generally at 84, will attract the movable field piece to this position.

The field coil 69 is connected by a wire 85 with a conducting strip 86 having a hole to fit about a pin 87, an extension 88 passing through a hole 89 in the housing part 50, and a forward extension 90 downwardly bent as indicated at 91 to form a center contact for a headlamp. The grounded strap 67 has extension 93 passing through a hole 94 in the housing part 50 and between it and the lugs 63 is a strap 92 having a forward extension 95 apertured forming the other contact for the headlamp 96 so that the lamp bulb is in series with the field winding. The ends of the straps 88 and 93 which project through holes 89 and 94 are connected to reversing switch mechanism to be described. This mechanism includes brush boxes 100, 100 received in holes 101 and carrying spring pressed brushes 102 bearing on the disk type commutator 103 carried on the armature shaft 104 and connected to armature windings as usual. The end 105 of the armature shaft is received in bearing hole 106.

The left housing part 51 shown fragmentarily in Figures 3 to 6 is of the same configuration as the outer housing part and adapted to meet it. It is provided with recesses 115 to meet dowel-like pins 116 extending forwardly from the housing part 50. Recesses and lugs opposite those in the housing part 50 and similar to them keep the contact rollers 64 in place and similar axle openings receive the axles. The housing part 51 has a lug 121 opposite to but higher than lug 62 to hold the strips 65 and 92 in place. The housing parts are secured together by spring clips 129. This housing part 51 carries a lateral offset gear bracket element indicated at 130. It has a shaft opening 131 for the end of the armature shaft 104 and an opening 132 for a shaft 133. The armature shaft carries a pinion 134 in mesh with a gear 135 on the shaft 133 and this gear 135 carries a pinion 136 in mesh with a gear 137 carried on a shaft 138 mounted in the housing part 51 and drivingly connected with wheels 139 on the axles 66.

When it is desired to operate the locomotive in but one direction, the movable element 71 of the field structure is locked in the position shown in dot and dash lines by a lever 160 pivoted on a post 160' provided in the housing part 51 and projecting upwardly. This lever holds the field part 71 against the stop 83 and against the field 70 and the motor will turn in the same direction on repeated applications of current.

When the lever 160 is in the full line position of Figure 2, the nose of the lever is away from the field structure 71 so that the field structure is free to move about the pivot 79. This movement is accomplished by a pawl 161 under the influence of a coiled spring 162. This spring is wound about a post 163 and is held against slipping off the post by a mating post 164 carried by the housing part 51. The free end 165 of the spring 162 is behind the movable field part, as viewed in Figure 2, and passes through a hole 166 in the pawl 161 and tends to shift this pawl upwardly as viewed in Figures 2 and 6. The pawl has a hump portion 167 which engages the field 71. The pawl engages the lower face of the movable field part and shifts it to the full line position bringing it against a stop member 168 carried by the housing part 50.

The pivot end 169 of the pawl 161 is received in a recess 170 formed in the housing part 51 and the other end of the pawl 161 passes through a slot 172 in the housing part 50. This slot is considerably wider than the pawl 161 to allow the pawl to have a lateral as well as back and forth movement. The housing part 50 has a sloping surface 173 leading to the slot 172. The casing also has a sloping surface 174 along which the end 166 of the spring rides. The pawl 161 as it shifts back and forth due to the movement of the field 71, has a swinging movement about the end 169 and also has a slight back and forth movement due to the camming action of the surface 176 of the pawl against the surface 173 of the casing. As a result, the nose 177 of the pawl moves transversely as well as in a generally vertical direction. Owing to the size of the slot 172 it is also possible for the pawl 161 to swing from the position of Figure 5 to the position of Figure 5a.

The pawl is actuated each time the lever 160 is shifted, also each time the current is supplied to the motor. The nose 177 of the pawl 161 projects into an outwardly opening recess 178 formed in the housing part 50 so that it is available for operating the reversing switch mechanism carried in this recess.

The brush boxes 100, 100 are in the form of metal turnings having brush receiving recesses 179. The large diameter portions of the brush boxes are broached to form, as here shown, three conducting segments marked 32a, 32b, 32c, 33a, 33b, 33c as above discussed. The diameter of these segments is less than half the distance separating the centers of the brush boxes so that the segments themselves are out of contact. The broached turnings having the brush receiving openings and the conducting segments are used as inserts for a body 181 of molded insulation having gear teeth 182' four times as numerous as the conducting segments.

The outwardly projecting ends 182 of field connected contact strip 88 and 183 of grounded contact 93 have offset prongs 184, 184 which enter holes 185 in contact springs 186 and 187, respectively. These springs have ends 186a and 186b, 187a, 187b, which bear on the cylindrical surfaces of the brush boxes. The parts are so proportioned as to carry out the cycle of operations above described upon successive applications of current. Turning the boxes one-twelfth of a revolution changes the contact relation so that current flows in one direction or the other or is cut off. The brush boxes 199 have reduced ends 188 and are held in place by a cover plate 189 secured over the recess 178.

The pawl 186 is utilized to effect the step by step advance of the gears and brush box segments. The nose 177 of the pawl is above and behind a tooth as indicated in Figure 5. As it moves down, it engages the gear tooth 181 in front of it and turns the gear clockwise. At the same time, it shifts laterally to the position of Figure 5a, the gear being advanced one-twelfth of a turn. When current supply to the motor is interrupted, or one manually releases the field by moving the lever 160, the spring 172 retracts the pawl causing it to pass up by the adjacent tooth and snap back to the position of Figure 5.

The arrangement shown in Figure 7 is generally the same as that previously described except that no provisions are made for stopping the motor. Here the brush boxes 200 and 201 carry five conducting segments 200 A—E and 201 A—E, respectively, and are drivingly connected by the toothed gears 202, 203. The pawl 204 acts on gear 203 in the manner above described each time the field of the motor is energized. Bridging contacts 205 and 206 bear on the brush boxes. As shown, the left end of 205 bears on contact 200 A, while the right end of 206 bears on contact 201 A. The next time the indexing mechanism operates contact is made with 201 C and 200 E and the motor is reversed. The next time contact is made with 200 B and 201 B. Here the lamp 207 can be one with a much higher cold resistance as the armature is always in series with the field.

Figure 8:
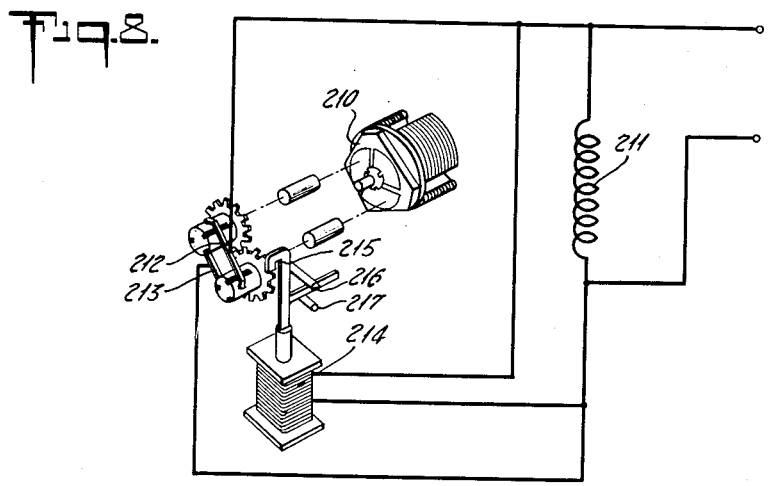
Figure 8 is a diagrammatic view illustrating a disk commutator type, shunt wound motor with electromagnetic operator independent of the field coil.

The arrangement shown in Figure 8 utilizes a disk commutator type armature 210 and a shunt field 211. The bridging straps 212 and 213 are connected across the field and have the same relations with the brush boxes as discussed with respect to Figure 1. Here a solenoid coil 214 operates a spring retracted pawl 215 past one of the gears as before. The pawl operates between stops 216 and 217 and can be manually actuated if desired.

Figure 9:
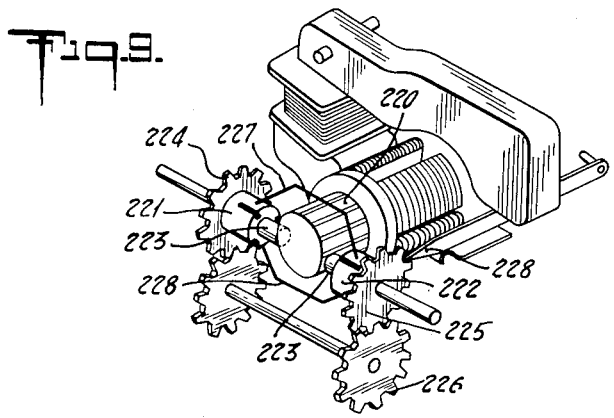
Figure 9 diagrammatically illustrates a motor of cylindrical commutator type equipped with the combined brush box-reversing switch controller.

In the arrangement shown in Figure 9, the armature shaft carries a cylindrical commutator 220. The brush boxes 221 and 222 carry brushes 223 opposite one another and having their axes of rotation normal to the surface contacted by the same. The brush boxes carry gears 224 and 225 and are connected by back gearing 226 so as to turn in unison. Bridging conductors 227 and 228 span the brush boxes and are connected in series or in shunt with the field as desired. Obviously a manually or electromagnetically operated indexing mechanism may be used instead of the field operated one indicated at 228.

Since it is obvious that the invention may be embodied in other forms and constructions within the scope of the claims, we wish it to be understood that the particular forms shown are but a few of these forms, and various modifications and changes being possible, we do not otherwise limit ourselves in any way with respect thereto.

What is claimed is:

1. In combination, a motor having an armature, commutator connected to the armature, two brush boxes carrying brushes bearing on the commutator, means for mounting each brush box for rotation about an axis normal to the commutator surface contacted by the brush therein, each brush box being provided with circumferentially arranged, alternate, conducting and non-conducting segments, means for concurrently turning the brush boxes about the respective axes and maintaining predetermined angular relations for the brush boxes so that the segments on one brush box are positioned relative to the segments on the other brush box in a predetermined manner, and two fixed bridging conductors normally of different polarity each having contacts bearing on the segmented surfaces of each brush box and so located that when one contact on either conductor engages a conducting segment on one brush box the other contact on such conductor engages an insulating segment on the other brush box so that polarity of current supplied the brushes is reversed each time the boxes are turned an amount equal to one-half the angular spacing of the conducting segments.

2. The combination claimed in claim 1, wherein the motor has a wound field connected to one of said bridging conductors and the brush box turning means includes a spring returned ratchet and pawl mechanism actuated by energization of the field.

3. The combination claimed in claim 1, wherein the motor has a wound field connected to one of said bridging conductors and the brush box turning means includes a spring returned ratchet and pawl mechanism actuated by energization of the field, and having manual means to lock the ratchet and pawl mechanism against spring return so that the armature current polarity is maintained.

4. The combination claimed in claim 1, wherein the motor has a wound field connected to one of the bridging contacts and a movable field portion, and the brush box turning means includes a ratchet and pawl mechanism actuated by the movable field portion on energization of the field and a spring biasing the pawl away from the ratchet and the movable field portion away from the armature.

5. The combination claimed in claim 1, wherein the commutator is of the disc type and the brush boxes turn on parallel axes and are gear connected, and wherein the box turning means includes a spring biased pawl acting on one of the gears; electromagnetic means for actuating the pawl, and manual means for locking the electromagnetic means and spring against operation.

6. The combination claimed in claim 1, wherein the brush box turning means includes an indexing mechanism which turns them one step at a time, and the spacing and disposition of the conducting and insulating segments are such that reversal is effected with each actuation of the indexing mechanism.

7. The combination claimed in claim 1, wherein the brush box turning means includes an indexing mechanism which turns them one step at a time, and the spacing and disposition of the conducting and insulating segments are such that on alternate steps reversal is effected and in intermediate steps the circuit is opened to at least one brush box so that the motor armature is deenergized.

8. The combination claimed in claim 1, wherein the brush boxes have an odd number of conducting segments and the turning mechanism has twice as many steps per revolution of the brush boxes so that reversal is effected for each step.

9. The combination claimed in claim 1, wherein the brush boxes have an odd number of conducting segments and the turning mechanism has four times as many steps per revolution of the brush boxes so that the motor armature circuit is opened between reversals of polarity.

10. The combination claimed in claim 1, wherein the motor has a wound field connected to one of said bridging conductors, the brush box turning means includes a spring returned ratchet and pawl mechanism actuated by energization of the field and wherein the brush boxes have an odd number of conducting segments and the turning mechanism has four times as many steps per revolution of the brush boxes so that the motor armature circuit is opened between reversals of polarity.

11. The combination claimed in claim 1, wherein the motor has a wound field connected to one of said bridging conductors and the brush box turning means includes a spring returned ratchet and pawl mechanism actuated by energization of the field and manual means to lock the ratchet and pawl mechanism against spring return so that the armature current polarity is maintained and wherein the brush boxes have an odd number of conducting segments and the turning mechanism has four times as many steps per revolution of the brush boxes so that the motor armature circuit is opened between reversals of polarity.

12. The combination claimed in claim 1, wherein the motor has a wound field connected to one of the bridging conductors and a movable field portion, and the brush box turning means includes a ratchet and pawl mechanism actuated by the movable field portion on energization of the field and a spring biasing the pawl away from the ratchet and the movable field portion away from the armature and wherein the brush boxes have an odd number of conducting segments and the turning mechanism has four times as many steps per revolution of the brush boxes so that the motor armature circuit is opened between reversals of polarity.

13. The combination claimed in claim 1, wherein the commutator is of the disc type and the brush boxes turn on parallel axes and are gear connected, and wherein the box turning means includes a spring biased pawl acting on one of the gears, electromagnetic means for actuating the pawl and manual means for locking the electromagnetic means and spring against operation and wherein the brush boxes have an odd number of conducting segments and the turning mechanism has four times as many steps per revolution of the brush boxes so that the motor armature circuit is opened between reversals of polarity.

14. The combination claimed in claim 1, wherein the commutator is of the cylindrical type and the brush boxes turn on axes radial of the cylinder axis, and wherein the box turning means includes gearing connecting the boxes and electromagnetically operated ratchet and pawl mechanism for turning the gearing step by step.

15. The combination claimed in claim 1, wherein the box turning means includes a manually operable ratchet and pawl mechanism.

16. The combination claimed in claim 1, wherein the conducting and insulating segments of each box are on a cylindrical surface with parallel axes, and the bridging conductors are each in the form of a V-shaped spring and disposed on opposite sides of the pair of brush boxes.

17. A motor having a two part insulating housing with aligned shaft bearing openings, an armature carrying shaft mounted in said openings and provided with a disc type commutator, the housing part adjacent the commutator having two brush box openings parallel with the shaft openings, a metalic brush box rotatably carried in each brush box opening and carrying a brush bearing on the commutator, each brush box extending through the opening and being provided with angularly spaced segments, and carrying an insulating body which provides insulating segments between the conducting segments and carries a gear, the gears being in mesh so that the boxes rotate concurrently, and have predetermined angular relations, a pawl pivoted in the housing part remote from the commutator and having an end extending through an aperture in the other housing part adjacent one of the gears for engagement with the teeth thereof, a pawl biasing spring, which holds the pawl against the movable field part and said field part away from the armature, the movable field part upon being moved toward the armature actuating the pawl and advancing the gears and brush boxes the angular spacing of a tooth, a field connected conductor bridging the brush boxes and bearing on the segmented surfaces thereof, a line-connected conductor bridging the brush boxes and bearing on the segmented surfaces thereof, the bridging conductors and segments being so located that neither bridging conductor can contact more than one conducting segment at a time, and each can simultaneously contact one such conducting segment.

18. A motor having a field with field winding having one side connected to a power supply, an armature shaft carrying armature windings and a disk type commutator, conducting brush boxes carrying brushes bearing on the commutator and insulatedly supported for rotation about axes parallel with the shaft axis, the brush boxes each having a segmented periphery of a diameter less than the spacing of the brush box axis from one another and carrying an insulating body between the segments to provide a cylindrical surface with alternately insulating and conducing segments, the insulating bodies also having gears, with twice the number of teeth as segments and in mesh with one another so that the brush boxes may be angularly shifted concurrently, two resilient bridging straps one connected to the other side of the field winding and the other to the other side of the power supply, each strap having a spring finger bearing on each cylindrical surface, the angular positions of the sectors being such that one conducting sector of each gear box contacts with one spring finger of a bridging strap at a time, the other finger bearing on an insulating sector so that the brush boxes may be alternately connected to the field and the other side of the power supply as the brush boxes are turned, and step by step means acting on one of the brush boxes to turn it one tooth and thereby effect a reversal of direction of rotation of the armature with each step.

19. A motor having a field with field winding having one side connected to a power supply, an armature shaft carrying armature windings and a disk type commutator, conducting brush boxes carrying brushes bearing on the commutator and insulatedly supported for rotation about axes parallel with the shaft axis, the brush boxes each having a segmented periphery of a diameter less than the spacing of the brush box axes from one another and carrying an insulating body between the segments to provide a cylindrical surface with alternate insulating and conducting segments, the insulating bodies also having gears, with four times the number of teeth as segments and in mesh with one another so that the brush boxes may be angularly shifted concurrently, two resilient bridging straps one connected to the other side of the field winding and the other to the other side of the power supply, each strap having a spring finger bearing on each cylindrical surface, the angular positions of the sectors being such that one conducting sector of each gear box contacts with one spring finger of a bridging strap at a time, the other finger bearing on an insulating sector so that the brush boxes may be alternately connected to the field and the other side of the power supply or disconnected from both as the brush boxes are turned, and step by step means acting on one of the brush boxes to turn it one tooth and thereby effect a reversal of direction of rotation of the armature with each alternate step and stop the motor at the intermediate steps.

20. A combined brush rigging and reversing switch for controlling the direction of rotation of a motor having a disk type commutator, comprising two brush boxes carrying brushes adapted to be on the commutator, means for mounting the brush box for rotation about parallel axis, each brush box being provided with circumferentially arranged, alternate conducting and non-conducting segments, step by step means for concurrently turning the brush boxes about the respective axes and maintaining predetermined angular relations for the brush boxes so that the segments on one brush box are positioned relative to the segments on the other brush box in a predetermined manner, and two fixed bridging conductors normally of different polarity each having contacts bearing on the segmented surfaces of each brush box and so located that when one contact on either conductor engages a conducting segment on one brush box the other contact on such conductor engages an insulating segment on the other brush box so that polarity of current supplied the brushes is reversed each time the boxes are turned an amount equal to one-half the angular spacing of the conducting segment.

21. A series motor having a field structure with a fixed and a movable part, spring means for biasing the movable part away from the armature when deenergized, a reversing switch in the armature circuit having an intermediate open circuit position, an auxiliary current consuming device in series with the field and permanently in shunt with the armature and reversing switch, so that the field may be energized when the armature circuit is open, and indexing mechanism actuated by the movements of the movable field structure part for operating the reversing switch to start, stop and reverse the motor.

22. In a toy electric locomotive adapted for use in an intermittently energized track and having a series motor continuously connected at both sides of the track, an armature current reversing switch between the field coil and one track connection, the switch having an open circuit position, a headlight in series with the field winding and in shunt with the armature and reversing switch, and a field operated indexing means responsive to current flowing through the headlight irrespective of whether the armature is in series with the field for shifting the reversing switch.

23. A reversing switch comprising two rotors geared together to turn in unison, each rotor carrying an output terminal and a plurality of conducting segments connected to one another and the output terminal and alternating with insulating segments, two input terminals, a pair of spring contacts connected with each input terminal and bearing on the rotors, one spring contact of each pair bearing on a conducting segment on each rotor and on an insulating segment of the other rotor, and an intermittent drive for turning the rotors an angular amount equal to one-half the angular pitch of the conducting segments, whereby current reversal to the output terminals is effected upon each such operation.

24. A reversing switch as claimed in claim 23, wherein the intermittent drive operates in steps of one-half the amount to effect such movement and the angular extent of the insulating segment is greater than that of the conducting segments so that both spring contacts engage only insulating segments alternately with engagement by each with a conducting segment.

JOSEPH L. BONANNO.
RICHARD E. BEGER.

REFERENCES CITED

The following references are of record in the file of this patent:

UNITED STATES PATENTS

| Number | Name | Date |
|---|---|---|
| 1,586,221 | Schwarzenhauer | May 25, 1926 |
| 1,622,815 | Sparkes | May 29, 1927 |
| 1,800,331 | Whiting | Apr. 14, 1931 |
| 1,947,078 | Cobb | Feb. 13, 1934 |
| 1,961,276 | Boisselier | June 5, 1934 |
| 2,013,947 | Boisselier | Sept. 10, 1935 |
| 2,152,704 | Massoneau | Apr. 4, 1939 |
| 2,484,358 | Stapleton | Oct. 11, 1949 |